US010619746B2

(12) United States Patent
Kubota

(10) Patent No.: US 10,619,746 B2
(45) Date of Patent: Apr. 14, 2020

(54) REGULATING VALVE, VALVE BODY, VALVE STEM, AND LOCKING MEMBER

(71) Applicant: Azbil Corporation, Chiyoda-ku (JP)

(72) Inventor: Kou Kubota, Chiyoda-ku (JP)

(73) Assignee: Azbil Corporation, Chiyoda-ku (JP)

(*) Notice: Subject to any disclaimer, the term of this patent is extended or adjusted under 35 U.S.C. 154(b) by 133 days.

(21) Appl. No.: 15/686,537

(22) Filed: Aug. 25, 2017

(65) Prior Publication Data

US 2018/0058590 A1    Mar. 1, 2018

(30) Foreign Application Priority Data

Aug. 26, 2016 (JP) ................................. 2016-165556

(51) Int. Cl.
*F16K 1/48* (2006.01)
*F16K 27/02* (2006.01)

(52) U.S. Cl.
CPC .............. *F16K 1/487* (2013.01); *F16K 1/48* (2013.01); *F16K 27/02* (2013.01)

(58) Field of Classification Search
CPC . F16K 1/487; F16K 1/48; F16K 1/482; F16K 1/50; F16K 27/02; F16K 31/1262; F16K 31/126; F16K 3/246; F16L 19/005; F16B 39/025; F16B 39/028; F16B 39/103; F16B 39/105; F16B 39/106; F16B 39/108;

(Continued)

(56) References Cited

U.S. PATENT DOCUMENTS 880,751 A * 3/1908 Parker ..................... F16B 39/16
411/233
974,073 A * 10/1910 Kesberger ............... F16B 39/24
411/126

(Continued)

FOREIGN PATENT DOCUMENTS

CN  201284784 Y  8/2009
CN  202284600 U  6/2012

(Continued)

OTHER PUBLICATIONS

Combined Chinese Office Action and Search Report dated Jul. 23, 2019, in Patent Application No. 201710737117.1, citing document AO therein, 9 pages (with English Translation of Category of Cited Documents).

(Continued)

*Primary Examiner* — Reinaldo Sanchez-Medina
*Assistant Examiner* — David Colon-Morales
(74) *Attorney, Agent, or Firm* — Oblon, McClelland, Maier & Neustadt, L.L.P.

(57) ABSTRACT

A regulating valve includes a valve body having a cylindrical portion, a valve stem, and a locking member. The valve body includes a female screw formed on the inner wall of the cylindrical portion and at least one chamfered portion formed on the outer wall of the cylindrical portion. The valve stem includes a first male screw and a second male screw formed on the surface close to the other end of the valve stem. The locking member includes a nut corresponding to the second male screw and a tongue portion formed integrally with the nut, extends in a direction orthogonal to an axial line S from one end portion of the nut, and is bendable in the direction parallel to the axial line.

1 Claim, 14 Drawing Sheets

(58) Field of Classification Search
CPC ........ F16B 39/38; F16B 39/28; F16B 39/284;
F16B 39/32; F16B 7/04; F16B 7/0406;
F16B 7/0426; F16B 7/06; F16B 7/18;
F16B 7/182; F16B 7/187; F16B 17/004;
F16B 21/12; F16B 2021/14; F16B 21/16;
F16B 35/005; F16B 35/04; Y10T 403/29;
Y10T 403/295; Y10T 403/32598; Y10T
403/556
USPC ......... 251/61.2, 61, 61.5; 411/233, 122–124,
411/983; 285/92, 382, 386
See application file for complete search history.

(56) References Cited

U.S. PATENT DOCUMENTS

| | | | | |
|---|---|---|---|---|
| 999,842 A * | 8/1911 | Nielsen | F16B 39/108 411/123 |
| 1,039,017 A * | 9/1912 | Bonness | F16B 39/16 267/164 |
| 1,071,622 A * | 8/1913 | Lotstrom | F16B 39/108 411/123 |
| 1,113,344 A * | 10/1914 | Hodges | F16B 39/108 411/123 |
| 1,117,563 A * | 11/1914 | Hale | F16B 39/108 411/123 |
| 1,156,243 A * | 10/1915 | Millikin | F16B 39/108 411/123 |
| 1,179,305 A * | 4/1916 | Harding | F16B 39/108 411/123 |
| 1,371,134 A * | 3/1921 | West | F16B 39/108 411/123 |
| 1,372,178 A * | 3/1921 | Loving | F16B 39/10 411/122 |
| 1,374,054 A * | 4/1921 | Bridge | F16B 39/108 411/124 |
| 1,394,741 A * | 10/1921 | Klocke | F16B 39/26 411/135 |
| 1,558,736 A * | 10/1925 | McCoy | F16B 39/24 411/123 |
| 1,580,015 A * | 4/1926 | Clark | F16B 39/24 411/131 |
| 1,621,854 A * | 3/1927 | Saloun | F16B 39/24 411/123 |
| 1,657,949 A * | 1/1928 | Wilson | F16B 39/108 411/123 |
| 1,685,120 A * | 9/1928 | Carns | F16B 39/108 411/201 |
| 1,875,930 A * | 9/1932 | Martin | F16B 39/26 29/509 |
| 2,128,429 A * | 8/1938 | Olson | F16B 39/24 411/123 |
| 2,132,825 A * | 10/1938 | Lind | B26B 17/02 411/236 |
| 2,149,359 A * | 3/1939 | Olson | F16B 37/02 411/170 |
| 2,286,895 A * | 6/1942 | Carlson | F16B 39/286 411/291 |
| 2,347,852 A * | 5/1944 | Thompson | F16B 37/02 411/285 |
| 2,546,332 A * | 3/1951 | Costello | F16B 39/286 411/9 |
| 2,598,052 A * | 5/1952 | Hallock | B21K 1/707 411/288 |
| 2,895,523 A * | 7/1959 | Avendano Lopez | F16B 39/16 411/233 |
| 2,952,289 A * | 9/1960 | Kreidel | F16B 39/38 411/290 |
| 3,101,210 A * | 8/1963 | Johnson | F16K 1/48 285/333 |
| 3,648,718 A * | 3/1972 | Curran | F16K 1/465 137/269 |
| 3,722,860 A * | 3/1973 | Curran | F16K 1/465 251/332 |
| 5,022,875 A * | 6/1991 | Karls | B63H 23/34 403/320 |
| 5,090,854 A * | 2/1992 | Hafeli | F16B 39/28 411/155 |
| 6,935,615 B2 * | 8/2005 | McCarty | F16B 7/0426 251/214 |
| 6,939,074 B2 * | 9/2005 | Gethmann | F16K 31/44 403/43 |
| 6,976,816 B2 * | 12/2005 | Slesinski | F16B 39/103 411/120 |
| 6,991,218 B2 * | 1/2006 | Lovell | F16K 1/48 251/357 |
| 7,721,753 B2 * | 5/2010 | Wears | F16K 1/48 137/315.27 |
| 8,186,919 B2 * | 5/2012 | Blair | F16B 39/108 411/125 |
| 8,474,786 B2 * | 7/2013 | Schneider | F16K 1/487 251/81 |
| 8,820,704 B2 * | 9/2014 | Alman | F16K 31/1264 251/61.5 |
| 9,010,720 B2 * | 4/2015 | Richardson | F16K 1/487 251/321 |
| 9,022,070 B2 * | 5/2015 | Anderson | F16K 1/487 137/625.3 |
| 9,033,308 B2 * | 5/2015 | Kiesbauer | F16K 1/48 251/291 |
| 9,194,502 B2 * | 11/2015 | Decker | F16K 3/246 |
| 9,441,757 B2 * | 9/2016 | McCarty | F16K 31/44 |
| 9,915,374 B2 * | 3/2018 | Alman | F16K 1/36 |
| 2009/0146096 A1 * | 6/2009 | Davies, Jr. | F16K 1/48 251/333 |
| 2015/0276078 A1 * | 10/2015 | Xiao | F16K 1/48 251/366 |

FOREIGN PATENT DOCUMENTS

| | | |
|---|---|---|
| CN | 102979926 A | 3/2013 |
| CN | 203412900 U | 1/2014 |
| CN | 204852389 U | 12/2015 |
| CN | 205298219 U | 6/2016 |
| CN | 205350012 U | 6/2016 |
| DE | 10 2014 017 549 A1 | 6/2016 |
| JP | 52-30596 Y2 | 7/1977 |
| JP | 60-146966 | 8/1985 |
| JP | 2013-142470 A | 7/2013 |

OTHER PUBLICATIONS

Combined Chinese Office Action and Search Report dated Jul. 23, 2019, in Patent Application No. 201710737117.1, 9 pages (with English Translation of Category of Cited Documents).

Combined Chinese Office Action and Search Report dated Jan. 14, 2019 in Chinese Patent Application No. 201710737117.1 (with English Translation of Category of Cited Documents), 10 pages.

* cited by examiner

REGULATING VALVE, VALVE BODY, VALVE STEM, AND LOCKING MEMBER

CROSS-REFERENCE TO RELATED APPLICATIONS

The present application claims the benefit of and priority to Japanese Patent Application No. 2016-165556, filed on Aug. 26, 2016, the entire contents of which are incorporated herein by reference.

FIELD

The present disclosure relates to a regulating valve, a valve body, a valve stem, and a locking member and, more particularly, to a coupling structure between a valve stem and a valve body in a regulating valve.

BACKGROUND

Generally, in a regulating valve, a valve stem is coupled to a valve body (plug) by engaging the valve stem with the valve body via screwing (see JP-A-60-146966). However, if the engagement is performed only by screwing, vibrations of the valve body caused when the regulating valve performs flow rate control of fluid may loosen the screwing. Accordingly, a pin is used as one means for preventing (locking) the screwing from being loosened in a conventional regulating valve.

FIGS. 13 and 14 illustrate examples of the coupling structure between a valve stem and a valve body in conventional regulating valves. FIG. 13 illustrates the coupling structure of a valve stem and a valve body of a conventional typical globe valve and FIG. 14 illustrates the coupling structure of a valve stem and a valve body of a globe valve in which a bellows has been welded to a conventional valve stem.

As illustrated in FIGS. 13 and 14, in conventional regulating valves, after a valve body 91 is engaged with a valve stem 92 by screwing, through-holes 91A and 92A are formed in the valve body 91 and the valve stem 92 in the screwed region, respectively, and a pin 94 (for example, a taper pin or a spring pin) is inserted into the through-holes 91A and 92A to prevent the screwing from being loosened between the valve body 91 and the valve stem 92.

SUMMARY

However, the conventional method in which a pin is inserted into a through-hole formed in the engagement portion by screwing between the valve stem and the valve body has the following problems.

For example, the case in which the valve body 91 illustrated in FIG. 13 needs to be replaced because it has been damaged is considered. In this case, it is economical to replace only the valve body 91 and continuously use the intact valve stem 32. When only the valve body 91 is replaced, it is necessary to prepare a new valve body 91 and form a through-hole 91A in this valve body 91. However, it is not easy to bore a new through-hole 91A because the new through-hole 91A needs to be aligned with a through-hole 92A, which has been formed, of the valve stem 92 when the valve body 91 is engaged with the valve stem 92 by screwing. Even if such boring is enabled, since components of a regulating valve need to be replaced in a site such as a plant in which the regulating valve is installed, it is not practical to bore a through-hole as described above in the site such as a plant in which the regulating valve is installed.

For this reason, conventionally, even when either the valve stem or the valve body is damaged, a new set of a valve stem and a valve body is manufactured in the manufacturing factory or the like, a through-hole is bored in the valve stem and the valve body in the state in which the valve stem is engaged with the valve body by screwing, and the processed valve stem and valve body are transported to the installation site for replacement.

In the method in which a valve stem and a valve body are replaced as one set, the effects in terms of cost is small when the components to be replaced are inexpensive. However, when the valve body 91 is damaged in the regulating valve having the valve stem 92 to which a bellows 93 has been welded as illustrated in, for example, FIG. 14, since the valve stem 92, which is expensive, to which the bellows 93 has been welded needs to be replaced in addition to the valve body 91, the cost of replacing the components becomes high.

In addition, in the coupling structure in which a pin is inserted into through-holes formed in the engagement portion by screwing between the valve stem and the valve body as in conventional regulating valves, since the through-hole is formed in part of threads, the entire engagement force is reduced by the amount equivalent to the area of the through-hole.

The disclosure addresses the above problems with an object of providing a regulating valve that facilitates the replacement of components while keeping the engagement force by screwing between the valve stem and the valve body.

A regulating valve (1) according to the disclosure includes a valve body (11) having one end at which a plug head (110) is provided and the other end at which a cylindrical portion (111) is provided, the plug head controlling a flow rate of a fluid in a valve box (10), a valve stem (12) having one end connected to a setting/operating device (14) and the other end inserted into the cylindrical portion and coupled to the valve body, and a locking member (15) for preventing coupling between the valve body and the valve stem from being loosened, in which the valve body includes a female screw (112) having threads formed on an inner wall of the cylindrical portion and at least one chamfered portion (113) formed on an outer wall of the cylindrical portion, the at least one chamfered portion including a plane parallel to an axial line (P) of the cylindrical portion, the valve stem includes a first male screw (120) having threads formed on a surface close to the other end of the valve stem, the threads corresponding to the female screw, and a second male screw (121) having threads formed on a surface close to the other end of the valve stem, the second male screw being disposed separately from the first male screw, the locking member includes a nut (150, 150D) having threads corresponding to the second male screw and a tongue portion (151, 151A to 151D) formed integrally with the nut so as to extend in a direction orthogonal to an axial line (S) of the nut from one end portion of the nut, the tongue portion being bendable in a direction parallel to the axial line, the valve body is coupled to the valve stem when the first male screw is engaged with the female screw, and the locking portion is coupled to the valve stem when the nut is engaged with the second male screw and the locking portion makes contact with the at least one chamfered portion when the tongue portion is bent.

In the regulating valve described above, the at least one chamfered portion of the valve body may include a plurality of chamfered portions.

In the regulating valve described above, the cylindrical portion may be formed in a quadrangle in plan view seen from an axial line direction.

In the regulating valve described above, the tongue portion (151) may be formed in a ring in plan view seen from an axial line direction of the nut.

In the regulating valve described above, the tongue portions (151A to 151D) may include a plurality of blades (152A to 152D) spaced apart from each other along an outer periphery of the nut, the blades being bendable in a direction parallel to the axial line of the nut.

In the regulating valve described above, the nut (150D) may be formed discontinuously in a circumferential direction so as to be elastically deformable in the circumferential direction.

It should be noted that reference numerals in the drawings corresponding to components of the disclosure are enclosed in parentheses in the above description.

For the reasons described above, according to the disclosure, it is possible to provide a regulating valve that facilitates the replacement of components while keeping the engagement force by screwing between the valve stem and the valve body.

DETAILED DESCRIPTION

Figure 1:
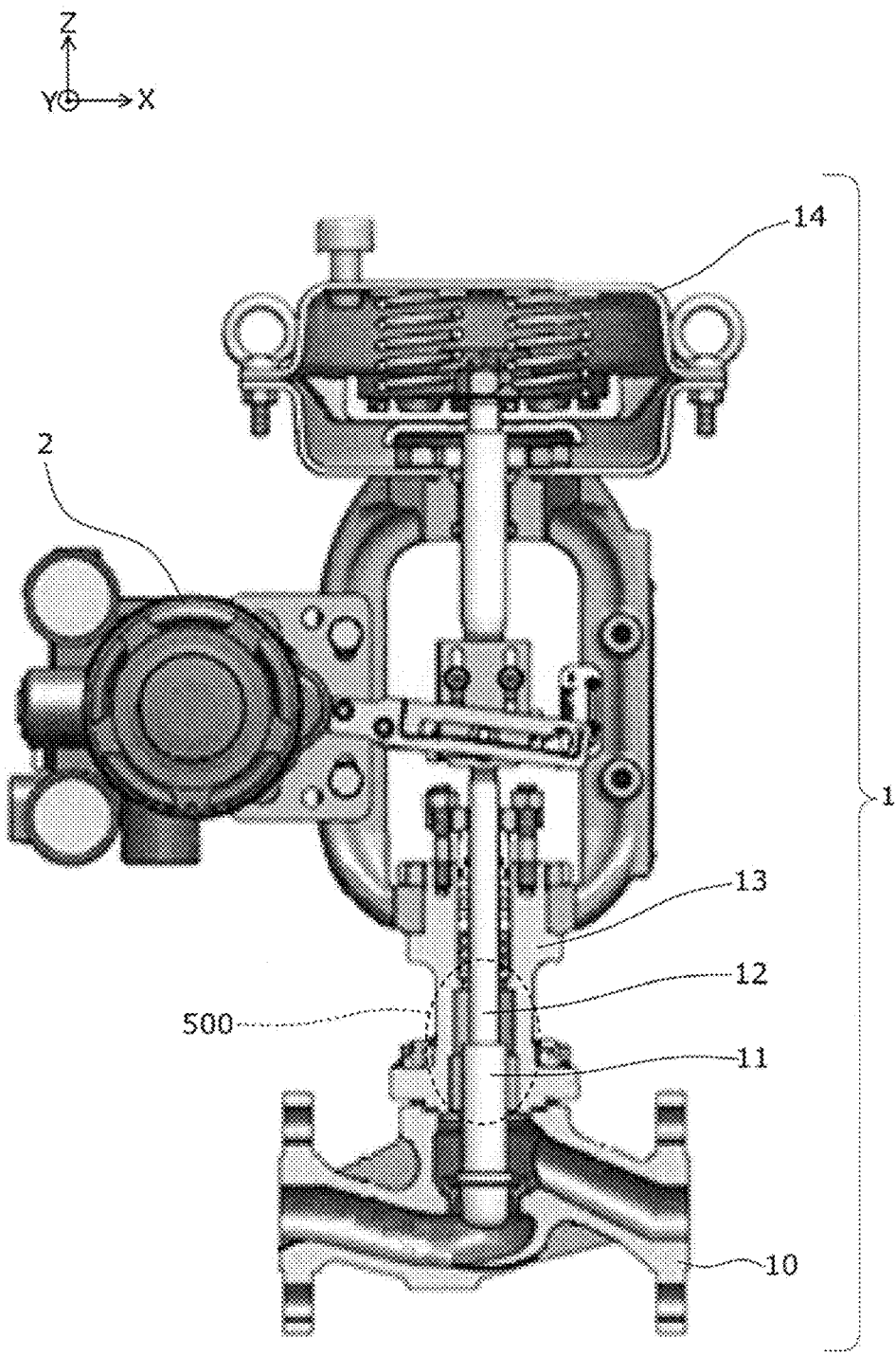
FIG. 1 schematically illustrates a regulating valve according to one embodiment.

Embodiments of the disclosure will be described below with reference to the drawings. It should be noted that components common to the individual embodiments are given the same reference numerals to omit the repeated descriptions.

FIG. 1 schematically illustrates the regulating valve according to one embodiment.

A regulating valve 1 illustrated in FIG. 1 includes, in a valve box 10, the valve body 11, a valve stem 12 for driving the valve body 11, a gland portion 13 having a guide ring and various types of packings for preventing the leakage of a control target fluid and holding the valve stem 12 slidably, and a setting/operating device 14 for operating the valve stem 12. The setting/operating device 14, which is, for example, an air type valve actuator, slides the valve stem 12 of the regulating valve 1 in the up-down direction (Y direction) in accordance with an output air pressure signal supplied from a positioner 2 attached to the regulating valve 1, to thereby control the opening and closing operation of the valve body 11. The fluid introduced into the regulating valve 1 may be a liquid or gas, and is not particularly limited.

The regulating valve 1 according to the embodiment is characterized by the coupling structure between the valve body 11 and the valve stem 12. The coupling structure between the valve body 11 and the valve stem 12 will be described in detail below. Although the case in which the regulating valve 1 has the valve body 11 of a cage shape is assumed in the following description, the type of the valve body 11 is not particularly limited.

Figure 2:
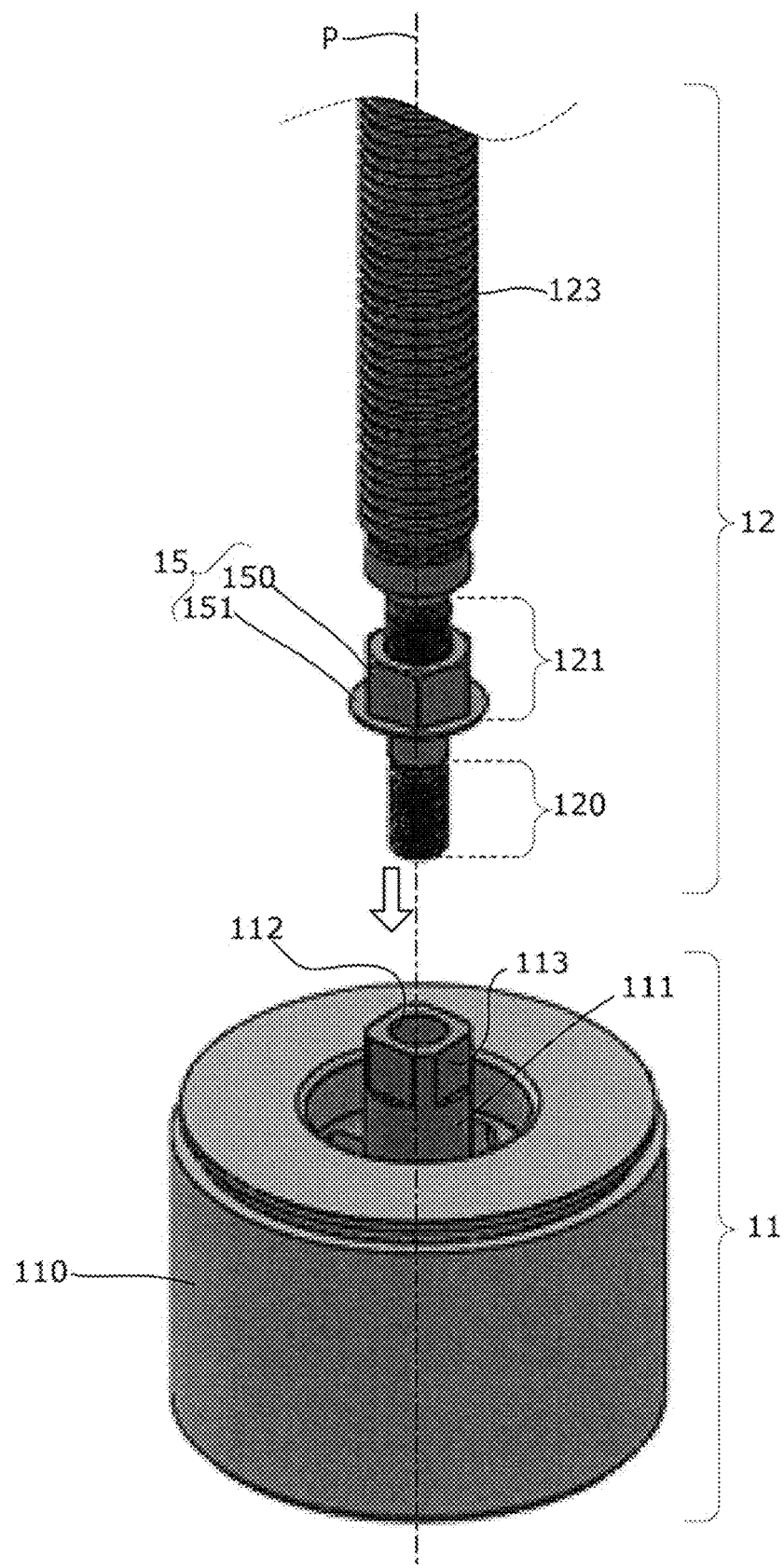
FIG. 2 is a perspective view schematically illustrating the valve body and the valve stem not engaged with each other.

FIG. 2 is a perspective view schematically illustrating the valve body 11 and the valve stem 12 not engaged with each other.

Figure 3:
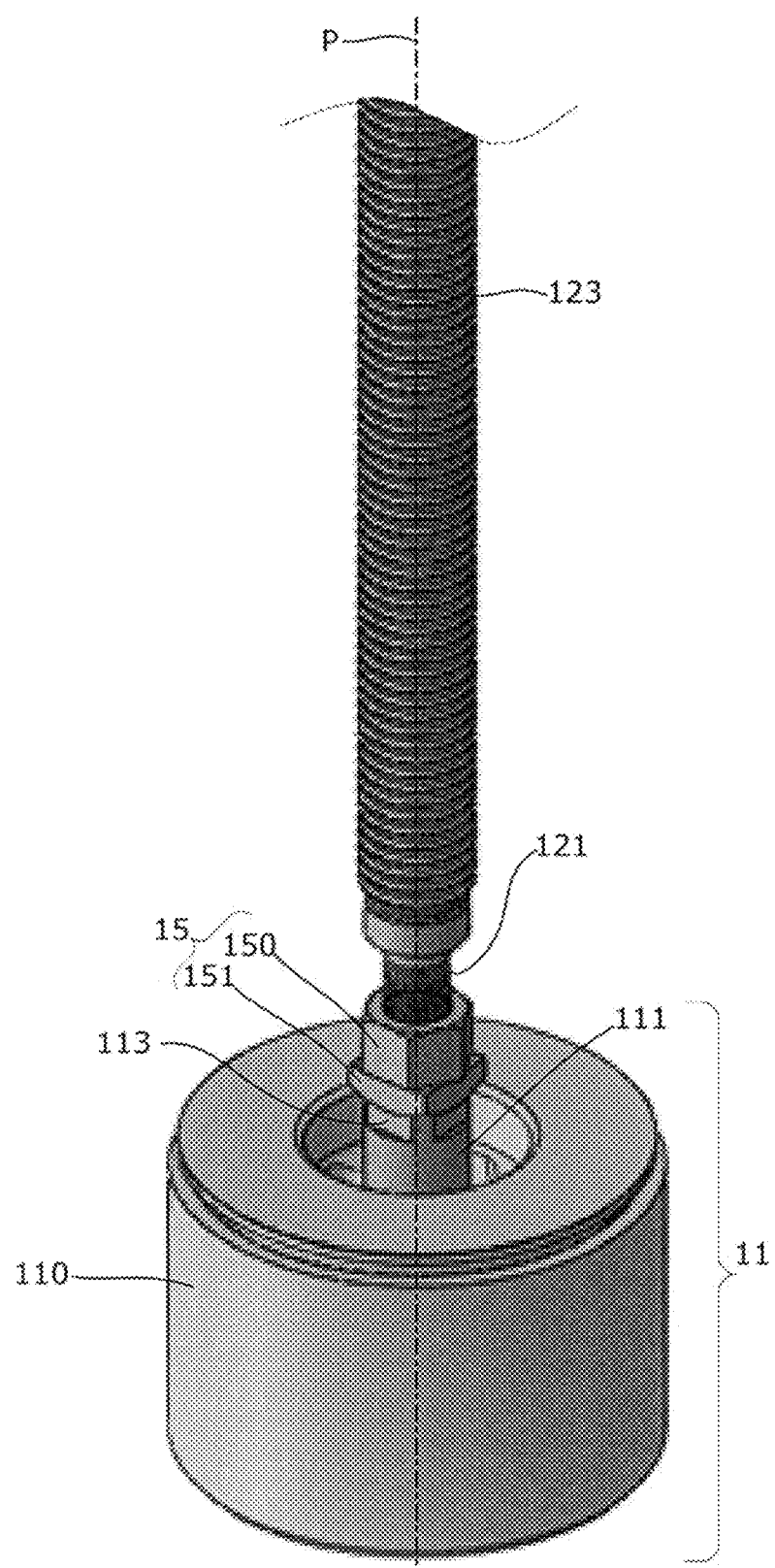
FIG. 3 is a perspective view schematically illustrating the valve body and the valve stem having been engaged with each other.

FIG. 3 is a perspective view schematically illustrating the valve body 11 and the valve stem 12 engaged with each other.

FIGS. 2 and 3 are enlarged views illustrating the region surrounded by a dotted line 500 of the regulating valve 1 in FIG. 1. The axial line of the valve body 11 and the valve stem 12 is represented by reference numeral P.

As illustrated in FIGS. 2 and 3, the regulating valve 1 has the structure in which the valve stem 12 is inserted into a cylindrical portion 111 of the valve body 11, a female screw 112 formed on the inner wall of the cylindrical portion 111 is engaged with a male screw 120 formed on the surface of the valve stem 12, and a bendable tongue portion 151 is bent and fixed to a chamfered portion 113 formed on the outer wall of the cylindrical portion 111 in the state in which a locking member 15 obtained by integrally forming the tongue portion 151 with a nut 150 is engaged with a male screw 121 formed separately from the male screw 120 on the surface of the valve stem 12 to prevent engagement between the valve body 11 and the valve stem 12 from being loosened.

First, the structure of the valve body 11 will be described.

Figure 4:
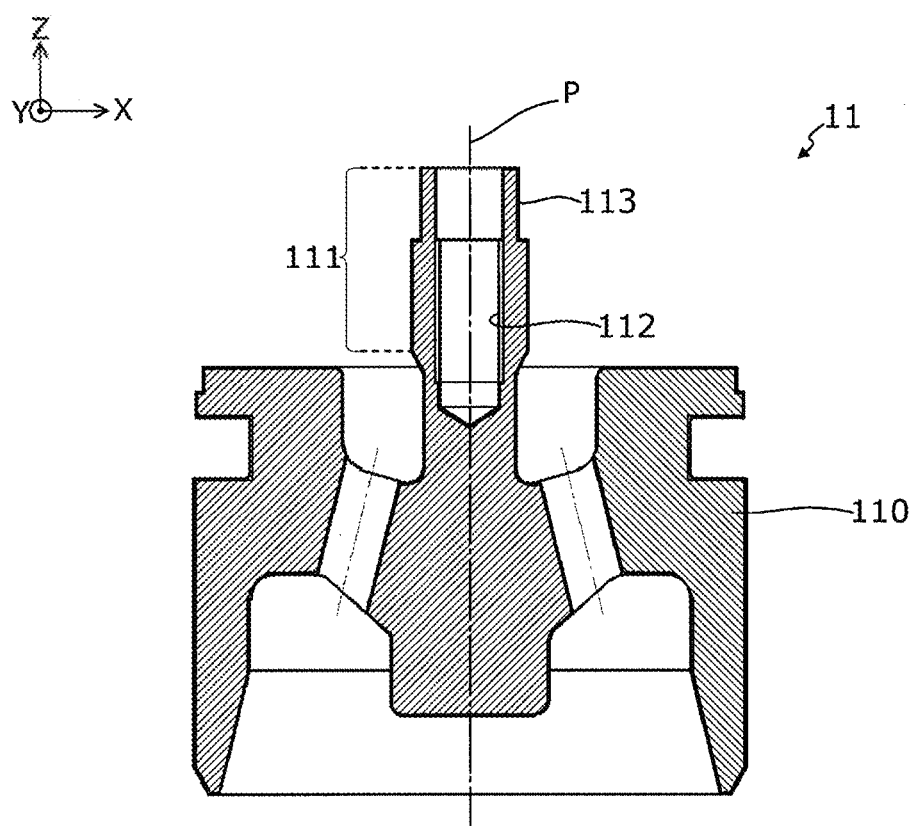
FIG. 4 schematically illustrates the cross section of a cylindrical portion 111 of a valve body 11 seen from a direction orthogonal to an axial line P.

FIG. 4 schematically illustrates the cross section of the cylindrical portion 111 of the valve body 11 seen from the direction orthogonal to the axial line P.

As illustrated in FIG. 4, the valve body 11 has a plug head 110 for controlling the flow rate of a fluid in the valve box 10 at one end thereof and has the cylindrical portion 111 at the other end thereof.

The cylindrical portion 111 is made of metal such as, for example, stainless steel SUS316. The cylindrical portion 111 has the female screw 112 including threads formed on the inner wall thereof and the at least one chamfered portion 113 formed on the outer wall thereof.

Figure 5:
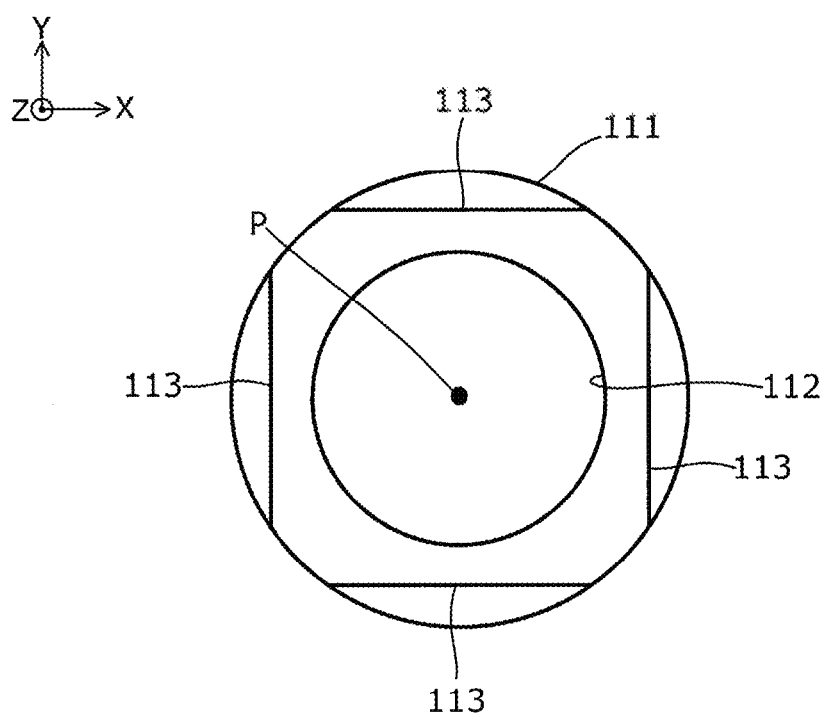
FIG. 5 is schematically illustrates the cylindrical portion of the valve body in plan view seen from the direction of the axial line P.

FIG. 5 is schematically illustrates the cylindrical portion 111 of the valve body 11 in plan view seen from the direction of the axial line P.

As illustrated in FIG. 5, the chamfered portions 113 are formed by cutting parts of the outer peripheral surface of an end portion of the cylindrical portion 111 formed in a cylinder so as to be a plane parallel to the axial line P. For example, when the four chamfered portions 113 are formed, four planes parallel to the axial line p are formed on the outer peripheral surface of one end portion of the cylindrical portion 111 as illustrated in FIG. 5 and the cylindrical portion 111 is quadrilateral in plan view. Two of the planes, that is, two of the chamfered portions 113 facing each other across the axial line P are parallel to each other.

Width W and length L of the chamfered portions 113 only need to be determined so that, when the locking member 15, which will be described later, is engaged with the valve stem 12, the tongue portion 151 thereof can be bent and fixed to the chamfered portions 113.

Although a plurality of (four) chamfered portions 113 is formed on the cylindrical portion 111 in the embodiment as an example, the disclosure is not limited to the embodiment as long as the number of the chamfered portions 113 is at least one.

Next, the structure of the valve stem 12 will be described.

Figure 6:
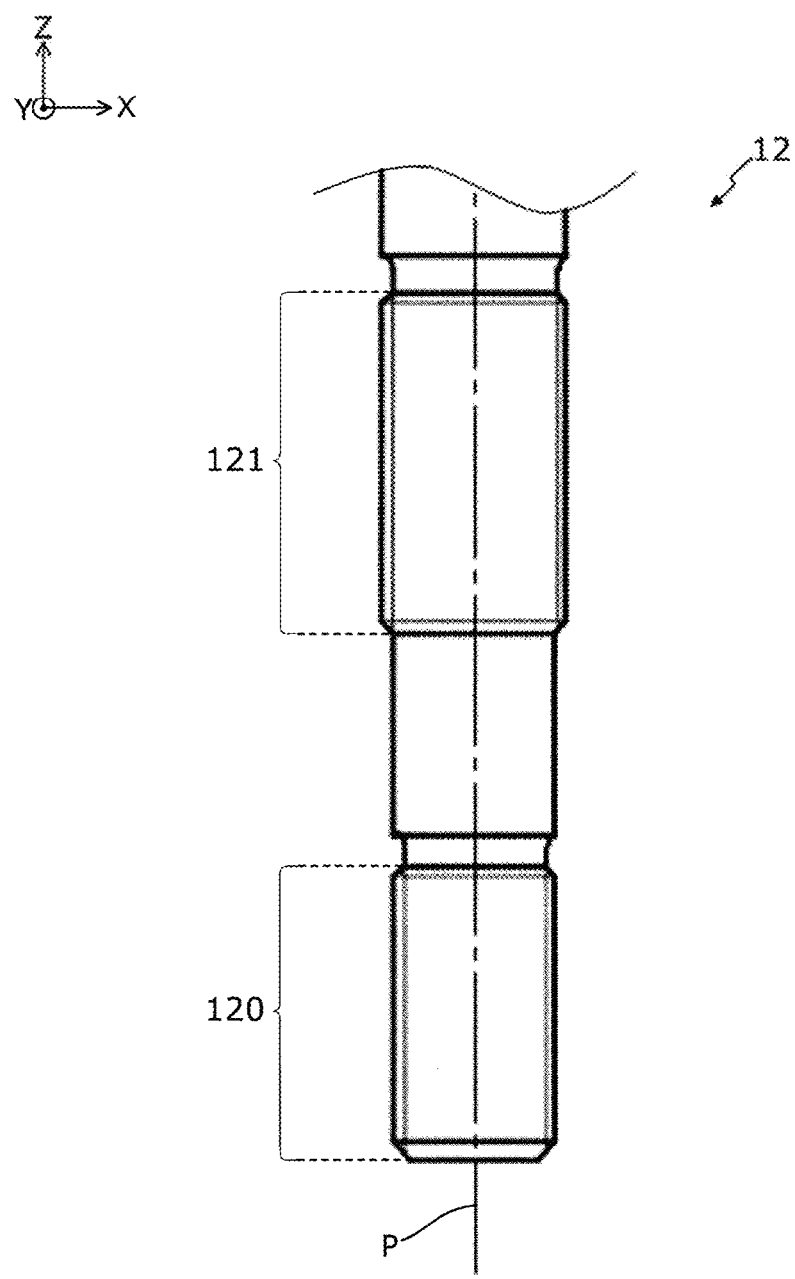
FIG. 6 schematically illustrates the valve stem in plan view seen from the direction orthogonal to the axial line P.

FIG. 6 schematically illustrates the valve stem 12 in plan view seen from the direction orthogonal to the axial line P.

The valve stem 12 is made of metal such as, for example, stainless steel SUS316. As illustrated in FIG. 6, the male screws 120 and 121 are formed in the part close to the other end of the valve stem 12.

The male screw 120 has threads corresponding to the female screw 112 of the cylindrical portion 111 of the valve body 11 described above and is formed on the surface of one end portion of the valve stem 12.

The male screw 121 has threads corresponding to the nut 150 of the locking member 15, which will be described later, and is formed separately from the threads of the male screw 120 on the surface of one end portion of the valve stem 12. As illustrated in FIG. 6, the outer diameter of the male screw 121 is larger than the outer diameter of the male screw 120.

Next, the structure of the locking member 15 will be described.

Figure 7A:
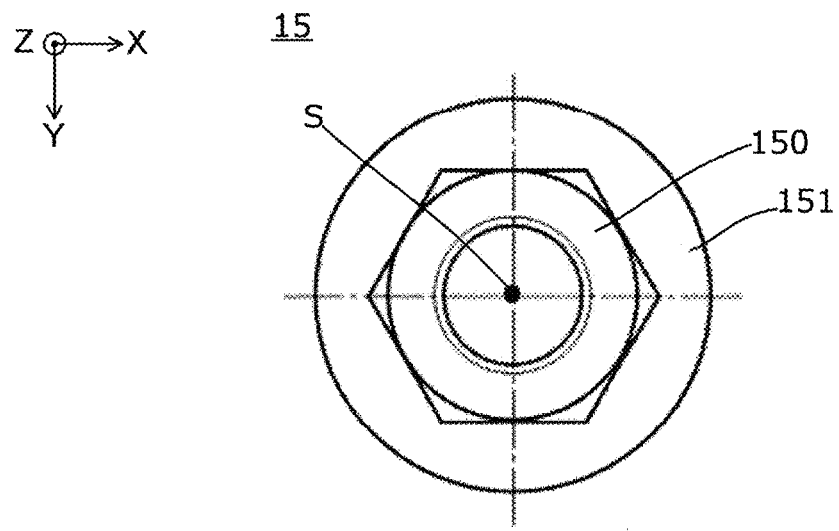
FIG. 7A schematically illustrates a locking member according to the one embodiment in plan view seen from the direction of an axial line S.
Figure 7B:
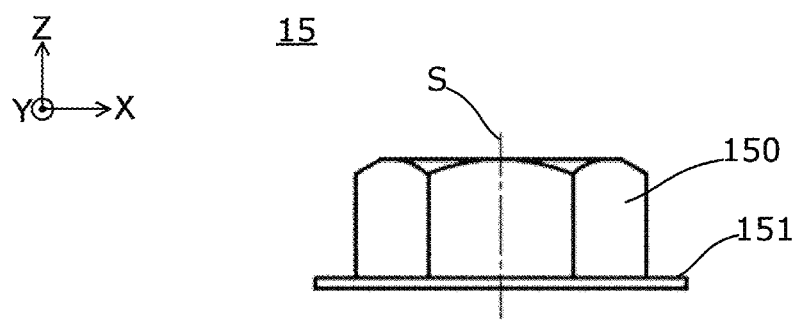
FIG. 7B schematically illustrates the locking member according to the one embodiment in plan view seen from the direction orthogonal to the axial line S.

FIGS. 7A and 7B illustrate the structure of the locking member according to one embodiment.

FIG. 7A schematically illustrates the locking member 15 in plan view seen from the direction of the axial line S and FIG. 7B schematically illustrates the locking member 15 in plan view seen from the direction orthogonal to the axial line S.

As illustrated in FIGS. 7A and 7B, the locking member 15 includes the nut 150 and the tongue portion 151.

The nut 150 has threads corresponding to the male screw 121 of the valve stem 12 described above.

The tongue portion 151 is formed integrally with the nut 150, extends in a direction orthogonal to an axial line S of the nut 150 from one end portion of the nut 150, and is bendable in the direction parallel to the axial line S. For example, the tongue portion 151 is formed in a ring in plan view, has plasticity in the vicinity of the coupling surface with the nut 150, and is bendable in the direction of the axial line S using the coupling surface as the fulcrum.

The tongue portion 151 only needs to have a shape fixable to the chamfered portions 113 of the cylindrical portion 111 when it is bent and this shape is not limited to the ring shape in plan view illustrated in FIGS. 7A and 7B.

Figure 8A:
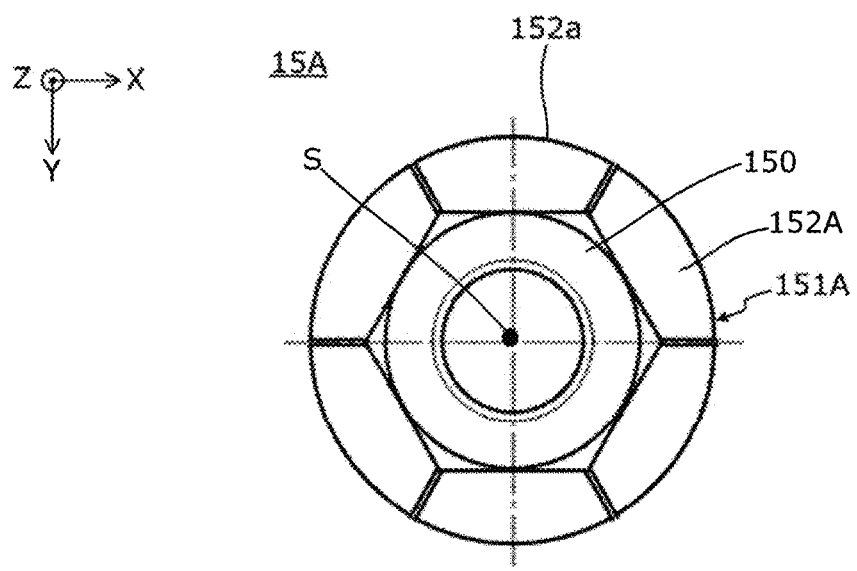
FIG. 8A schematically illustrates a locking member according to another embodiment in plan view seen from the direction of the axial line S.
Figure 8B:
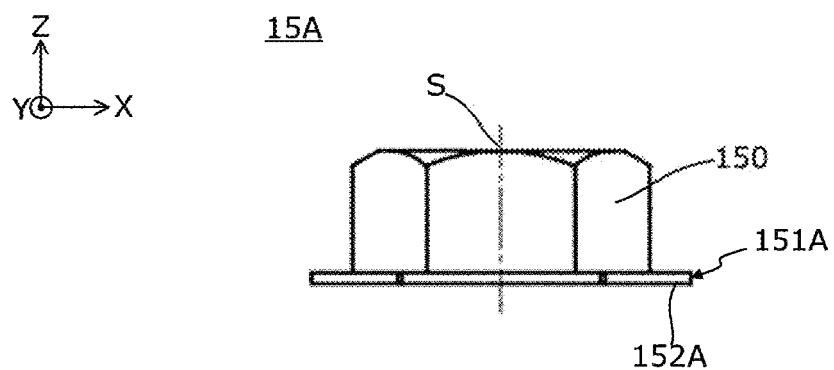
FIG. 8B schematically illustrates the locking member according to the other embodiment in plan view seen from the direction orthogonal to the axial line S.
Figure 9A:
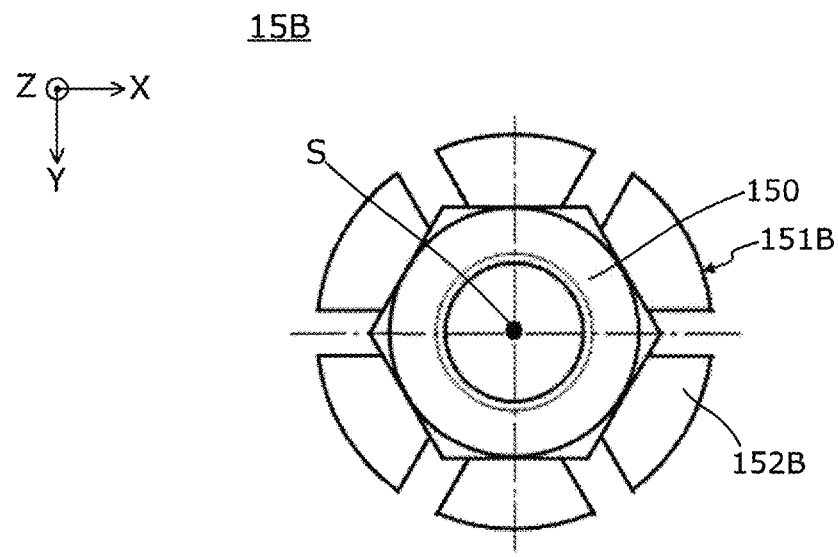
FIG. 9A schematically illustrates a locking member according to another embodiment in plan view seen from the direction of the axial line S.
Figure 9B:
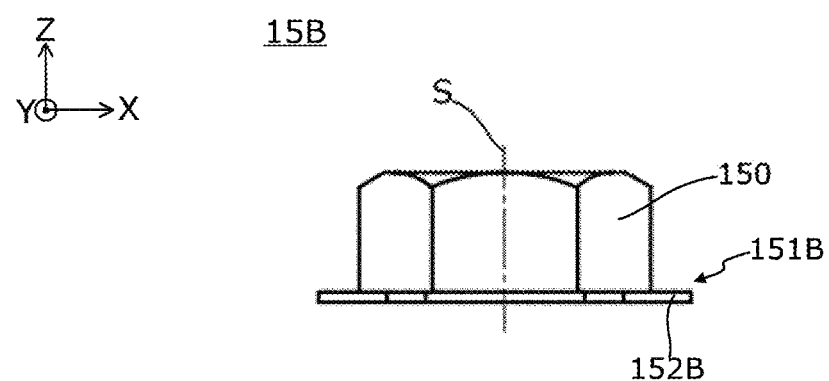
FIG. 9B schematically illustrates the locking member according to the other embodiment in plan view seen from the direction orthogonal to the axial line S.

For example, as in a locking member 15A illustrated in FIGS. 8A and 8B, a tongue portion 151A may include a plurality of blades 152A spaced apart from each other along the outer periphery of the nut 150 so as to be bendable in the direction parallel to the axial line S. In this case, the spacing between the blades 152A adjacent to each other is not particularly limited. For example, as in a locking member 15B illustrated in FIGS. 9A and 9B, a tongue portion 151B may include blades 152B having a wider spacing therebetween than in the blades 152A of the tongue portion 151 illustrated in FIGS. 8A and 8B.

Figure 10A:
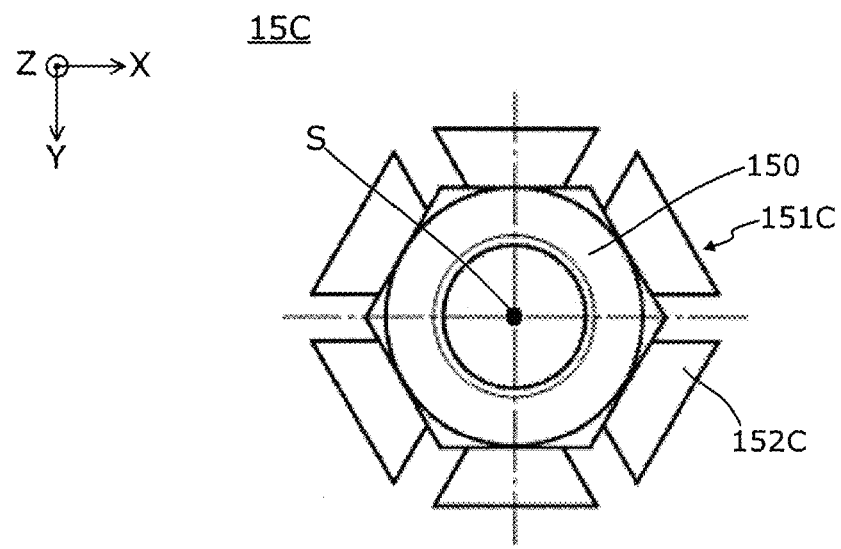
FIG. 10A schematically illustrates a locking member according to another embodiment in plan view seen from the direction of the axial line S.
Figure 10B:
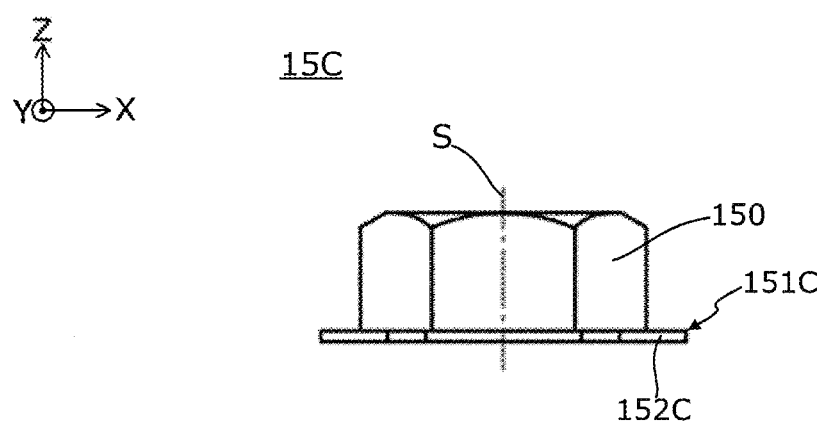
FIG. 10B schematically illustrates the locking member according to the other embodiment in plan view seen from the direction orthogonal to the axial line S.

In addition, in the shape of the plurality of blades 152A, one side 152a facing the coupling surface with the nut 150 does not need to be arcuate shaped as illustrated in FIGS. 8A and 8B and the sides of each blade 152C may be formed in straight lines as in a tongue portion 151C of a locking member 15C illustrated in FIGS. 10A and 10B.

In addition, the shape of the nut 150 of the locking member 15 is not limited to the shape illustrated in FIGS. 8A and 8B and the like. For example, as in a locking member 15D illustrated in FIGS. 11A and 11B, a nut 150D may be formed in a ring in plan view that is formed discontinuously in the circumferential direction. In this case, the nut 150D is elastically deformable in the circumferential direction so that the portion formed discontinuously is opened. For example, the nut 150D only needs to have a small thickness (length in the z direction) so as to be elastically deformable.

Also in this case, threads corresponding to the stale screw 121 of the valve stem 12 are formed on the inner wall of the nut 150D.

Next, the method for coupling the valve body 11 to the valve stem 12 will be described.

Figure 12:
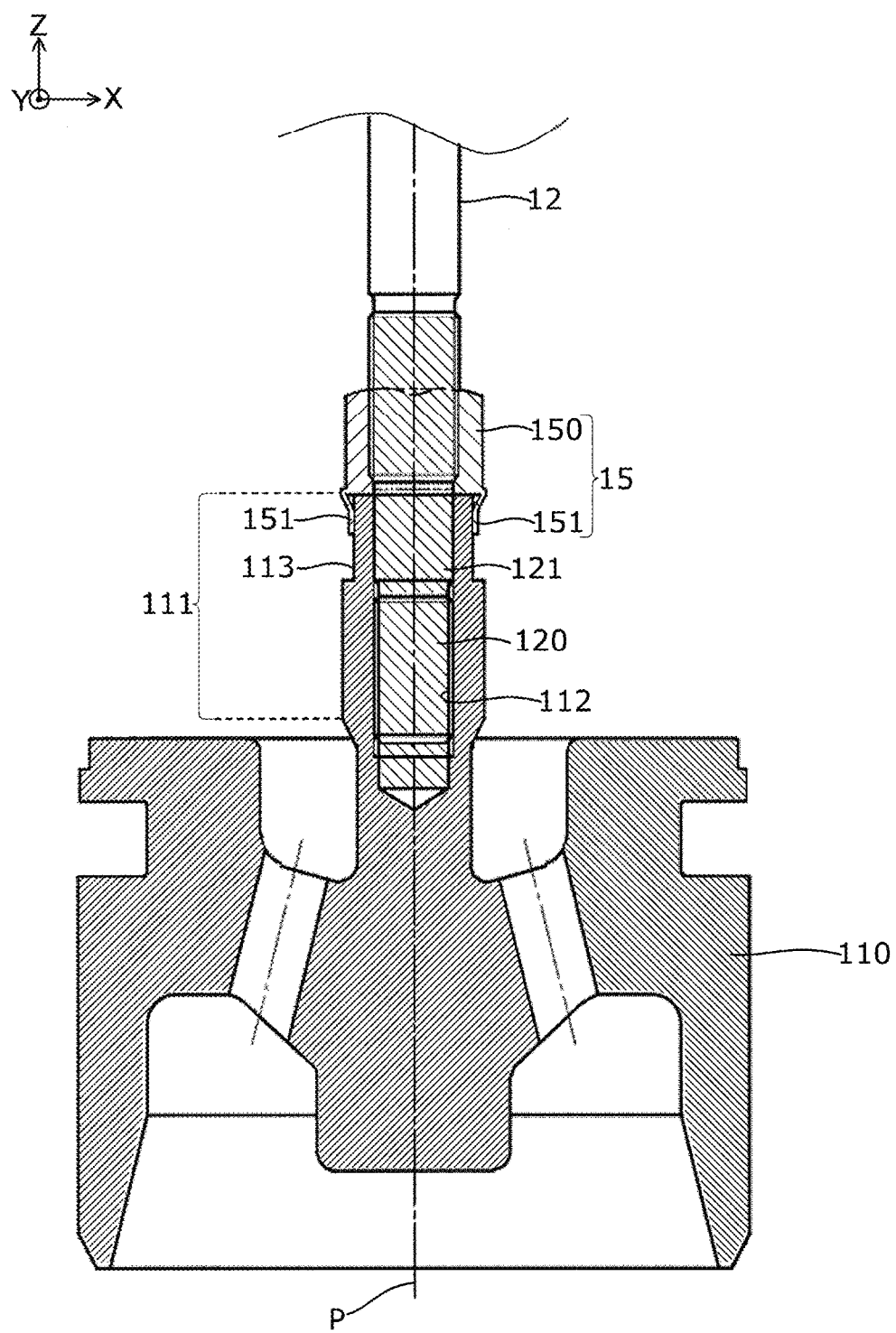
FIG. 12 schematically illustrates a cross section of the regulating valve in the state in which the valve body and the valve stem (coupled to each other) to which the locking member has been fixed.
Figure 13:
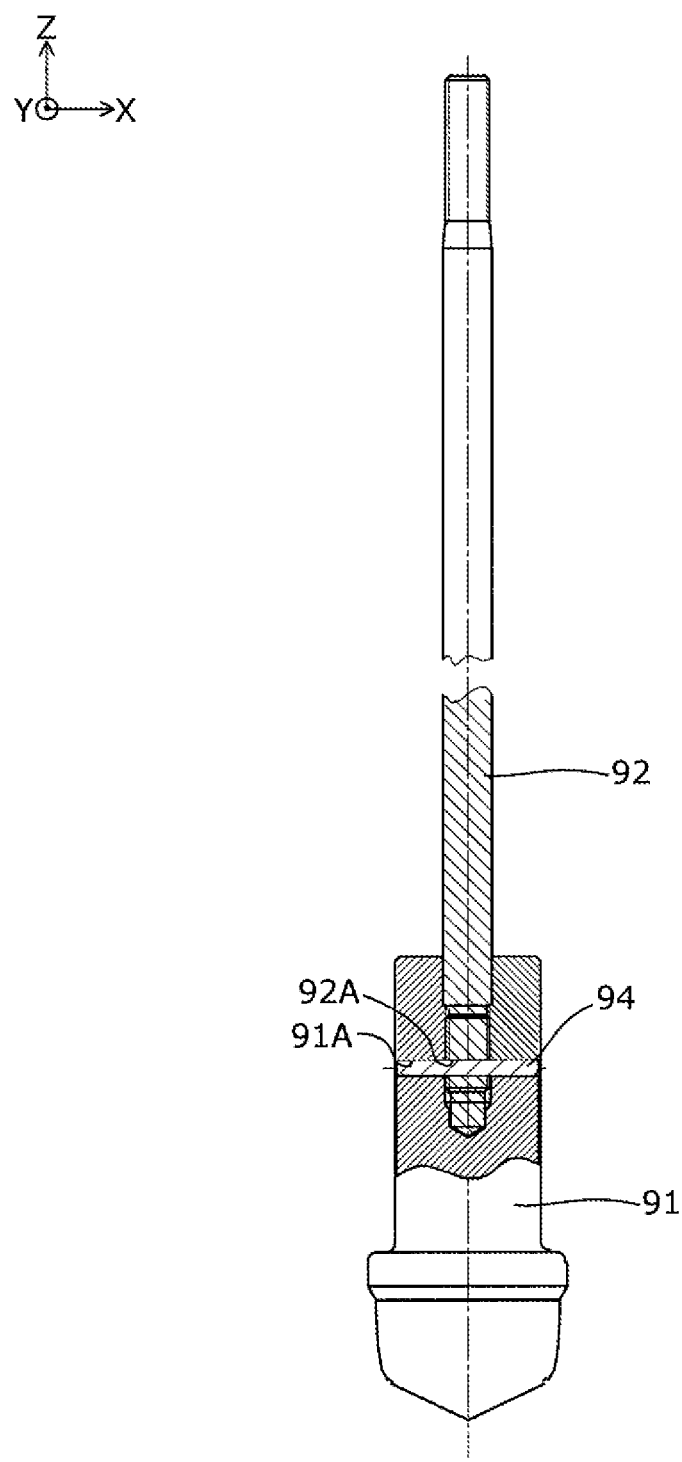
FIG. 13 illustrates an example of the coupling structure between a valve stem and a valve body in a conventional regulating valve.
Figure 14:
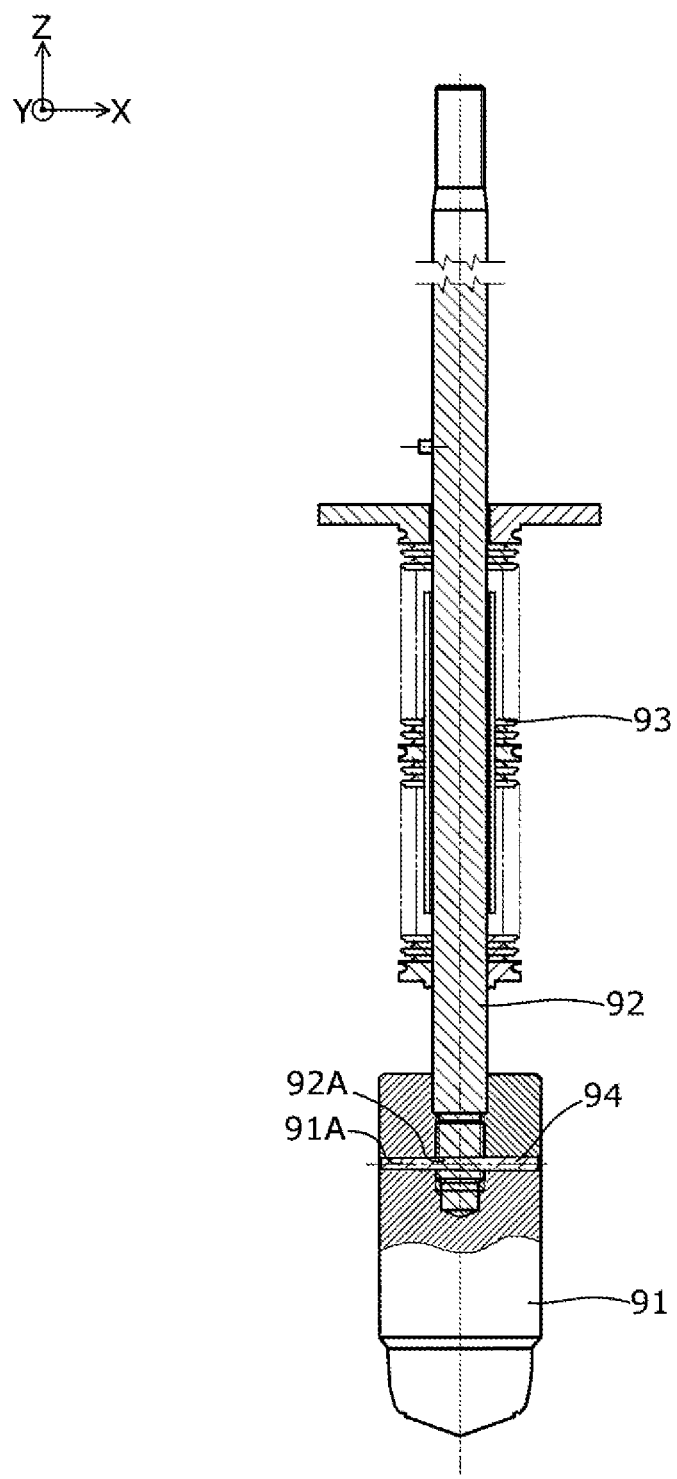
FIG. 14 illustrates an example of the coupling structure between a conventional valve stem and a valve body in a regulating valve having the valve stem to which a bellows has been welded.

FIG. 12 schematically illustrates a cross section of the regulating valve in which the locking member has been fixed to the valve body 11 and the valve stem 12 coupled to each other.

First, the worker engages the locking member 15 before being bent with the male screw 121 of the valve stem 12 so that the tongue portion 151 is oriented in the direction away from the setting/operating device 14. Next, as illustrated in FIG. 2, one end of the valve stem 12 with which the locking member 15 has been engaged is inserted into the cylindrical portion 111 of the valve body 11 in which the female screw 112 is formed and the male screw 120 is engaged with the female screw 112 at adequate torques. Next, the nut 150 of the locking member 15 is turned and the locking member 15 is fixed with the bottom surface of the tongue portion 151 pushed against the end portion of the cylindrical portion 111 of the valve body 11.

After that, as illustrated in FIGS. 3 and 12, the tongue portion 151 is bent and fixed to the chamfered portions 113 of the cylindrical portion 111. At this time, only the portion capable of making contact with the chamfered portions 113 needs to be bent and the entire tongue portion 151 does not necessarily have to be bent.

When using the locking member 15 (see FIGS. 8A and 8B to FIGS. 11A and 11B) having the tongue portion including the plurality of blades described above, only the blades 152 capable of making contact with the chamfered portions 113 may be bent or all blades 152 may be bent.

As described above, the tongue portion 151 of the locking member 15 is bent and fixed to the chamfered portion 113 of the valve body 11, so that screwing between the valve body 11 (female screw 112) and the valve stem 12 (male screw 120) can be prevented from being loosened.

The locking member 15 is preferably made of a metal having the same thermal expansion coefficient (for example, the linear expansion coefficient) as in the cylindrical portion 111 of the valve body 11 and the valve stem 12. For example, the locking member 15 is made of stainless steel SUS316 as in the cylindrical portion 111 of the valve body 11 and the valve stem 12. Since this makes the linear expansion coefficients of the locking member 15, the valve stem 12, and the valve body 11 identical to each other, it is possible to suppress reduction in the locking performance of the locking member 15 caused by changes in the temperature of the regulating valve 1.

In addition, fixation of the nut 150 to the tongue portion 151 gives importance to the locking member 15. For example, when a nut is prepared separately from a washer having a tongue portion and they are combined and then engaged with the male screw 121 of the valve stem 12, since the washer having a tongue portion is also loosened if the nut is loosened due to changes in the temperature of the regulating valve 1, effects of preventing looseness between the valve body 11 and the valve stem 12 are reduced.

In contrast, since the nut 150 and the tongue portion 151 are formed integrally and the tongue portion 151 is fixed to the chamfered portion 113 in the locking member 15, even when, for example, the temperature of the regulating valve 1 greatly changes, it is possible to prevent the locking member 15 itself (nut 150) from being loosened. Accordingly, more stable effects of preventing looseness between the valve body 11 and the valve stem 12 can be expected.

It should be noted that the locking member 15 has an object of fixing the valve stem 12 to the valve body 11, which are separate from the locking member 15, by bending the tongue portion 151, and does not have an object of distributing specific stress by increasing the contact area of the nut using a disc portion as a so-called flange nut.

As described above, since the regulating valve 1 according to the embodiment has the structure in which the valve stem 12 is inserted into the cylindrical portion 111 of the valve body 11, the female screw 112 formed on the inner wall of the cylindrical portion 111 is engaged with the male screw 120 formed on the surface of the valve stem 12, the locking member 15 obtained by forming the bendable tongue portion 151 integrally with the nut 150 is engaged with the male screw 121 formed separately from the male screw 120 on the surface of the valve stem 12, and the tongue portion 151 is bent so as to make contact with the chamfered portion 113 formed on the outer wall of the cylindrical portion 111 to prevent engagement between the female screw 112 and the male screw 120 from being loosened, even when either the valve body 11 or the valve stem 12 is damaged and needs to be replaced, it is possible to replace only the damaged component while continuously using the intact component, thereby enabling reduction in cost when the component is replaced.

For example, when the valve body 11 is damaged, it is only necessary to prepare a new valve body 11 having the same structure (that is, the structure in which the at least one chamfered port ion 113 is formed in the cylindrical portion 111) as the damaged valve body 11, screw the existing valve stem 12 into the valve body 11 so as to achieve the range of adequate torques, and bent the tongue portion 151 of the locking member 15 for fixation.

Since this eliminates the need to machine the grooves 114 in the new valve body 11 so that the grooves 114 are aligned with the existing holes 122 formed in the intact valve stem 12 in a site such as a plant in which the regulating valve is installed or to replace components including the intact valve stem 12, components can be replaced easily and the cost for replacing components can be suppressed as compared with conventional regulating valves.

In addition, since the structure prevents screwing between the valve body 11 and the valve stem 12 from being loosened by bending the tongue portion 151 of the locking member 15, engagement force by screwing between the valve body 11 and the valve stem 12 is not reduced as compared with the case in which through-holes are provided in the engagement portion between the valve body and the valve stem as in conventional regulating valves.

As described above, in the regulating valve 1 according to the embodiment, it is possible to achieve a regulating valve in which components can be easily replaced while keeping the engagement force by screwing between the valve stem and the valve body.

In addition, if a plurality of chamfered portions 113 is formed in the cylindrical portion 111 of the valve body 11, when the nut 150 is screwed with the male screw 121 of the valve stem 12 at an adequate torque and the tongue portion 151 is bent, the possibility of contact between the tongue portion 151 and the chamfered portions 113 can be increased and the contact area between the tongue portion 151 and the chamfered portions 113 can be increased. Since this further increases the engagement force between the locking member 15 and the valve body 11, effects of locking looseness of screwing between the valve body 11 and the valve stem 12 can be further improved.

In addition, as illustrated in FIGS. 8A and 8B to FIGS. 11A and 11B, the tongue portion 151 of the locking member 15 is configured by a plurality of blades 152 spaced apart from each other, so that the tongue portion 151 can be easily bent.

Figure 11A:
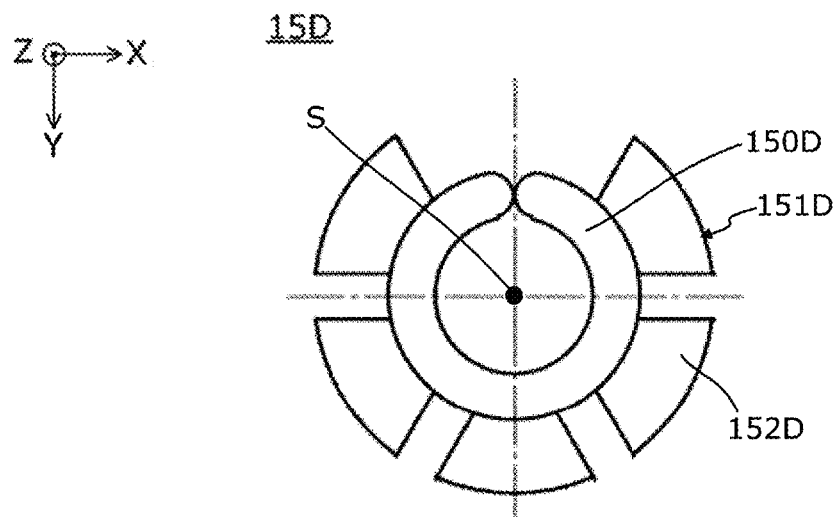
FIG. 11A schematically illustrates a locking member according to another embodiment in plan view seen from the direction of the axial line S.
Figure 11B:
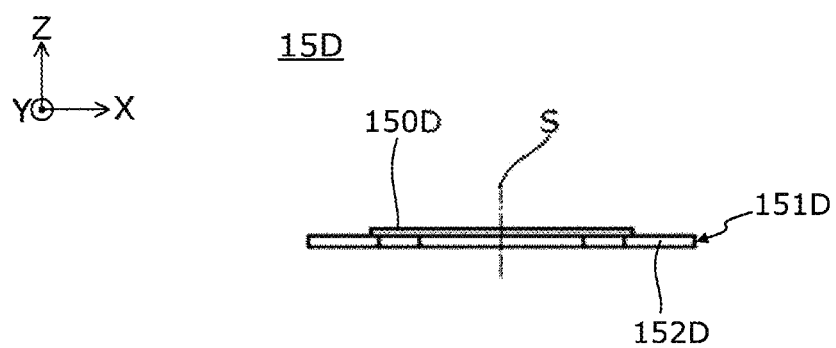
FIG. 11B schematically illustrates the locking member according to the other embodiment in plan view seen from the direction orthogonal to the axial line S.

In addition, if the nut 150A of the locking member 15 is formed discontinuously in the circumferential direction so as to be elastically deformable in the circumferential direction as illustrated in FIGS. 11A and 11B, attachment (engagement) of the locking member 15 to the valve stem 12 is facilitated. For example, if the locking member 15 is engaged with the male screw 121 of the valve stem 12 in the state in which the discontinuous portion of the nut 150D is extended in the circumferential direction after the valve stem 12 is engaged with the valve body 11, the locking member 15 can be attached to the valve stem 12, so the locking member 15 does not have to be attached (engaged) to the valve stem 12 in advance before the valve stem 12 is engaged with the valve body 11, thereby facilitating coupling work.

Although the inventions implemented by the inventors and the like has been described above specifically based on the embodiment, the disclosure is not limited to the disclosed embodiments and it will be appreciated that various modifications can be made without departing from the scope of the disclosure.

For example, although the regulating valve 1 has the plug head 110 of, for example, a cage shape in the above embodiment, the shape of the plug head 110 is not limited to the embodiment. For example, the plug head 110 may be cage-shaped, triangular, or multistage depressurization-shaped.

In addition, although a bellows 123 is welded to the valve stem 12 in the regulating valve 1 according to the above embodiment, the disclosure is not limited to the embodiment and the bellows 123 does not need to be formed.

DESCRIPTION OF REFERENCE NUMERALS
AND SIGNS

1: regulating valve, 10: valve box, 11: valve body, 12: valve stem, 13: gland portion, 14: setting/operating device, 15, 15A, 15B, 15C, 15D: locking member, 110: plug head, 111: cylindrical portion, 112: female screw, 113: chamfered portion, 120, 121: male screw, 123: bellows, 150, 150D: nut, 151, 151A, 151B, 151C, 151D: tongue portion, 152A, 152B, 152C, 152D: blade, P, S: axial line.

The invention claimed is:

1. A locking member for preventing engagement between a valve body and a valve stem of a regulating valve from being loosened, the locking member comprising:
   a nut on which threads are formed; and
   a tongue portion formed integrally with the nut at a coupling surface so as to extend in a direction orthogonal to an axial line of the nut from one end portion of the nut, the tongue portion being a ring having a continuous circular outer edge and being bendable in a direction parallel to the axial line,
   wherein the tongue portion has plasticity in a vicinity of the coupling surface with the nut and is bendable in the direction of the axial line using the coupling surface as a fulcrum.

* * * * *